(12) United States Patent
Anderton et al.

(10) Patent No.: US 9,257,878 B2
(45) Date of Patent: Feb. 9, 2016

(54) ARRANGEMENT OF CONDUCTING BAR ENDS

(75) Inventors: Alexander Anderton, Mellingen (CH); Thomas Baumann, Wettingen (CH); Massimiliano Vezzoli, Remigen (CH); Thomas Hillmer, Suhr (CH); Stephan Mueller, Wolfinswil (CH); Konstantinos Ballos, Schonenwerd (CH); Mostafa Sadeghi, Nussbaumen (CH); Dieter Stoll, Mellingen (CH); Hossein Safari Zadeh, Othmarsingen (CH)

(73) Assignee: ALSTOM TECHNOLOGY LTD., Baden (CH)

( * ) Notice: Subject to any disclaimer, the term of this patent is extended or adjusted under 35 U.S.C. 154(b) by 232 days.

(21) Appl. No.: 13/232,948

(22) Filed: Sep. 14, 2011

(65) Prior Publication Data

US 2012/0068560 A1    Mar. 22, 2012

(30) Foreign Application Priority Data

Sep. 22, 2010  (EP) ..................................... 10178174

(51) Int. Cl.
*H02K 9/22*       (2006.01)
*H02K 3/30*       (2006.01)
*H02K 3/38*       (2006.01)

(52) U.S. Cl.
CPC ... *H02K 3/30* (2013.01); *H02K 3/38* (2013.01)

(58) Field of Classification Search
CPC .............. H02K 3/38; H02K 3/30; H02K 9/22
USPC ...................................... 310/52, 260, 270, 45
See application file for complete search history.

(56) References Cited

U.S. PATENT DOCUMENTS

| | | | | |
|---|---|---|---|---|
| 3,151,260 A * | 9/1964 | MacCracken, Jr. et al. | .... | 310/43 |
| 3,428,871 A * | 2/1969 | Hartman | ................. | H01L 23/24 |
| | | | | 165/185 |
| 4,268,799 A * | 5/1981 | McCrickerd | .............. | H01S 3/08 |
| | | | | 372/103 |
| 4,309,636 A | 1/1982 | Pollok | | |
| 4,313,272 A * | 2/1982 | Matthews | ............. | F41G 11/001 |
| | | | | 42/115 |
| 5,142,182 A * | 8/1992 | Grant | ........................... | 310/270 |
| 5,627,107 A * | 5/1997 | Howard | .............. | C01B 21/0728 |
| | | | | 264/272.17 |
| 5,710,475 A | 1/1998 | Irwin et al. | | |
| 5,729,068 A | 3/1998 | Gasparini et al. | | |
| RE37,340 E * | 8/2001 | King, Jr. | ......................... | 174/87 |
| 6,486,575 B2 * | 11/2002 | Miller | ............................. | 310/43 |

(Continued)

FOREIGN PATENT DOCUMENTS

CN        1799177 A       7/2006
DE        4024395 A1      3/1991

(Continued)

OTHER PUBLICATIONS

Translation of foreign document DE 102005017113.*

(Continued)

*Primary Examiner* — Alex W Mok
(74) *Attorney, Agent, or Firm* — Buchanan Ingersoll & Rooney PC

(57) ABSTRACT

An arrangement includes conducting bar ends connected together and a cap covering them filled with a putty. The cap is made of a resin containing a high thermal conductivity filler. The putty is a silicone elastomer containing a high thermal conductivity filler.

13 Claims, 1 Drawing Sheet

(56) References Cited

U.S. PATENT DOCUMENTS

| | | | | |
|---|---|---|---|---|
| 6,525,437 B1 * | 2/2003 | Ozawa | | H02K 9/22 310/254.1 |
| 6,633,098 B2 * | 10/2003 | Inaba | | H02K 5/18 310/52 |
| 6,806,509 B2 * | 10/2004 | Yoshino | | H01L 33/56 257/103 |
| 6,901,198 B2 * | 5/2005 | Shimizu | | B29C 39/02 385/129 |
| 6,927,342 B1 * | 8/2005 | Brandes et al. | | 174/110 R |
| 7,042,124 B2 * | 5/2006 | Puterbaugh | | H02K 5/10 310/43 |
| 7,221,279 B2 * | 5/2007 | Nielsen | | A61F 13/42 340/384.1 |
| 7,690,262 B2 * | 4/2010 | Nakabayashi | | G01K 1/18 73/708 |
| 8,749,075 B2 * | 6/2014 | Mahler | | H01L 24/96 257/659 |
| 2002/0185752 A1 * | 12/2002 | Ishikawa | | H01L 23/3121 257/788 |
| 2003/0038278 A1 * | 2/2003 | Ishihara | | 252/500 |
| 2004/0145257 A1 * | 7/2004 | Oohashi | | H02K 3/38 310/71 |
| 2005/0182172 A1 * | 8/2005 | Kamimura | | C01F 7/02 524/430 |
| 2006/0038462 A1 * | 2/2006 | Holmes et al. | | 310/270 |
| 2007/0001292 A1 * | 1/2007 | Ohta et al. | | 257/718 |
| 2007/0041918 A1 * | 2/2007 | Meneghetti et al. | | 424/63 |
| 2007/0054122 A1 * | 3/2007 | Paisner et al. | | 428/403 |
| 2007/0246245 A1 * | 10/2007 | Ahn et al. | | 174/126.2 |
| 2008/0012477 A1 * | 1/2008 | Koo | | H05B 33/04 313/504 |
| 2008/0266746 A1 * | 10/2008 | Handa et al. | | 361/234 |
| 2009/0069876 A1 * | 3/2009 | Shohat | | A61B 18/04 607/105 |
| 2009/0159904 A1 * | 6/2009 | Lai | | H01L 25/075 257/88 |
| 2009/0179506 A1 * | 7/2009 | Saga | | H02K 5/08 310/45 |
| 2009/0224344 A1 * | 9/2009 | Huang | | H01L 27/14618 257/432 |
| 2010/0097789 A1 * | 4/2010 | Sharrah | | F21S 9/02 362/110 |
| 2010/0127386 A1 * | 5/2010 | Meyer-Berg | | H01L 21/565 257/698 |
| 2011/0156504 A1 * | 6/2011 | Kurahara | | H02K 3/325 310/43 |
| 2012/0243237 A1 * | 9/2012 | Toda | | F21V 23/006 362/306 |

FOREIGN PATENT DOCUMENTS

| | | | | |
|---|---|---|---|---|
| DE | 102005017113 A1 | * | 10/2006 | |
| EP | 0713281 A2 | | 5/1996 | |
| GB | 776216 A | * | 6/1957 | H01F 27/22 |
| GB | 957510 A | * | 5/1964 | H01L 23/3107 |
| GB | 1444608 A | * | 8/1976 | G21C 17/116 |
| JP | 54101107 U | * | 7/1979 | |
| JP | 06061503 A | * | 3/1994 | |
| JP | 06310564 A | * | 11/1994 | |
| JP | 2001110964 A | * | 4/2001 | |
| WO | WO 2011019026 A1 | * | 2/2011 | C08L 53/025 |

OTHER PUBLICATIONS

Feb. 28, 2015 Chinese Office Action issued in Chinese Application No. 201110290743.3 (with English language translation).

* cited by examiner

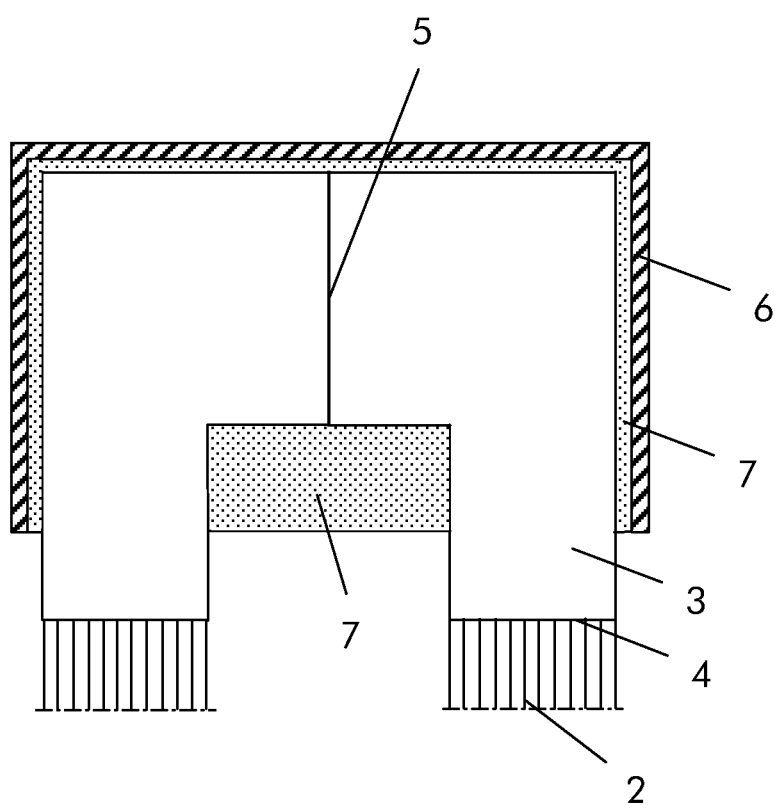

ARRANGEMENT OF CONDUCTING BAR ENDS

CROSS REFERENCE TO RELATED APPLICATIONS

The present application hereby claims priority under 35 U.S.C. Section 119 to European Patent application number 10178174.8, filed Sep. 22, 2010, the entire contents of which are hereby incorporated by reference.

FIELD OF INVENTION

The present invention relates to an arrangement of conducting bar ends. Specifically, the present invention relates to stator bar ends of a high voltage electric generator.

For sake of simplicity in the following only reference to an electric generator is made, it is anyhow clear that the electric machine may also be a different rotating high voltage electric machine, such as an electric motor.

BACKGROUND

Electric generators are known to comprise a stator and a rotor.

The stator has slots housing conducting or stator bars (also called Roebel bars). The bars typically have a straight part (the central part) that is housed within the slots, and bent parts at the two opposite ends.

The bent parts have copper lugs brazed at their ends; the copper lugs are then brazed together to electrically connect the conducting bars together and form the armature or stator winding of the generator.

In order to protect and electrically insulate the reciprocally connected copper lugs, box-shaped caps are provided that cover the lugs; a putty is then provided to hold the caps in place and to guarantee a sufficient heat flow from the bar ends to the outside.

In this respect, U.S. Pat. No. 4,309,636, which is incorporated by reference, discloses a fiberglass reinforced epoxy or polyester resin cap, arranged to receive the lugs of conducting bar ends and connect them together via a putty. The putty is an epoxy resin with a quartz meal as a filler.

Neither the epoxy resin, nor the quartz meal exhibits a good thermal conductivity; therefore the thermal conductivity of the putty is fairly low (typically 0.25 W/mK).

DE 40 24 395 discloses insulating caps covering reciprocally connected copper lugs.

EP 0 713 281 discloses an insulation that is applied around the lugs and is impregnated during bar impregnation.

The general trend in generator building is to increase the capability of the generator, which is partly done by increasing the current density.

In order to keep the bar end temperature at tolerable values, the heat transport through cups and putty has to be increased.

SUMMARY

The present disclosure is directed to an arrangement of conducting bar ends connected together and a cap, filled with a putty, covering them. The cap is made of a resin containing a high thermal conductivity filler. The putty is a silicone elastomer containing a high thermal conductivity filler.

The present disclosure is also directed to a cap for an electric machine. The cap being made of a resin, and containing a high thermal conductivity filler

BRIEF DESCRIPTION OF THE DRAWING

Further characteristics and advantages of the invention will be more apparent from the description of a preferred but non-exclusive embodiment of the putty and arrangement, illustrated by way of non-limiting example in the accompanying drawing, in which:

FIG. 1 is a schematic cross section of two lugs connected together with a putty-filled cap covering them.

DETAILED DESCRIPTION OF THE PREFERRED EMBODIMENTS INTRODUCTION TO THE EMBODIMENTS

A technical aim of the present invention therefore includes providing an arrangement and a cap addressing the aforementioned problems of the known art.

Within the scope of this technical aim, one aspect of the invention is to provide an arrangement and a cap by which the rotating electric machine components and, in particular, the lugs of the conductive bar ends and the caps associated thereto, are held within the limits of the allowed operating temperatures even at increased thermal losses due to the increased current density.

In particular the arrangement and cap in the embodiments of the invention allow an increased heat diffusion when compared to traditional arrangements and caps.

Advantageously, the thermal conductivity of the putty is greater than 1 W/mK.

Another aspect of the invention is to provide a good adhesion between the putty and the copper of the lugs as well as the putty and the cap under thermal cycling. Debonding at such interfaces would lead to the opening of crevasses, which have (if filled with air) a very bad thermal conductivity (about 0.02 W/mK). Such crevasses would strongly hinder the thermal flux from the lugs to the outside to such an extent that the beneficial effect of the increased thermal conductivity of the putty is null and void.

The technical aim, together with these and further aspects, are attained according to the invention by providing an arrangement and a cap in accordance with the accompanying claims.

DETAILED DESCRIPTION

With reference to the figure, an arrangement of two conducting bar ends (stator bar ends) connected together is shown.

Conducting bars such as stator bars have their straight parts housed into stator slots (not shown) and bent parts 2 (evolutes) converging one towards the other.

Each bent part 2 has a lug 3 brazed at its end in 4; the lugs 3 are solid copper elements typically having an L shape (other shapes are also possible). The lugs 3 have facing portions brazed in 5. A cap 6 is provided over the lugs 3, to house, contain, cover, protect and insulate them.

The cap 6 is comprised of a resin and preferably also a reinforcing structure (i.e. a composite material); for example the composite material is glass fibers embedded into a resin matrix, such as a polyester resin matrix.

Additionally, the cap 6 contains a high thermal conductivity filler, such as boron nitride (preferred filler), alumina or combinations thereof.

The cap 6 is filled with a putty 7 to lock it on the lugs 3 and help to discharge heat from the lugs 3 to the outside.

The putty 7 is a silicone elastomer, such as an addition curing two-part silicone rubber that vulcanizes at room temperature, like Polydimethylsiloxane with functional groups and auxiliaries for addition cross-linking and Polydimethylsiloxane with hydrogen groups mixed by means of a kneading machine, a roller mill or an extruder with a high thermal conductivity filler such as boron nitride, preferably hexagonal boron nitride powder.

A different high thermal conductivity filler that may also be employed is alumina; naturally also combinations of alumina and boron nitride are possible.

In particular the filler content in the silicone rubber is less than 45 wt% (i.e. 45% by weight) and preferably it is comprised between 36-43 wt% (i.e. 36-43% by weight).

Tests were carried out that showed that the putty 7 has the required large thermal conductivity, larger than 1.1 W/mK, and the required good adhesion with the cap and lugs.

In particular, it was ascertained that no debonding between putty 7 and lugs 3 (copper) or cap 6 occurred after five months of thermal cycling between 54-146° C. (6 hours holding time at each temperature).

In addition, the mechanical strength after thermal cycling was unchanged and no cracks in the putty were generated.

The arrangement according to the invention showed an improved connection over the traditional arrangements.

Naturally the features described may be independently provided from one another.

In practice the materials used and the dimensions can be chosen at will according to requirements and to the state of the art.

REFERENCE NUMERALS 2 bent part of a stator bar
3 lugs
4 end of 3
5 brazing
6 cap
7 putty

What is claimed is:

1. An arrangement of conducting bar ends connected together, the conducting bar ends comprising lugs connected together with a cap, the cap being filled with a putty, which has a thermal conductivity greater than 1 W/mK, and covering the conducting bar ends to discharge heat from the lugs to outside the arrangement, wherein:

the cap is comprised of a resin containing a high thermal conductivity filler, and the putty is a silicone elastomer containing a high thermal conductivity filler composed of at least one of boron nitride, alumina and combinations thereof.

2. The arrangement as claimed in claim 1, wherein the cap covers the reciprocally connected lugs.

3. The arrangement as claimed in claim 1, wherein the silicone elastomer is an addition curing two-part silicone rubber that vulcanizes at room temperature.

4. The arrangement as claimed in claim 3, wherein the two-part silicone rubber is Polydimethylsiloxane with functional groups and auxiliaries for addition cross-linking and Polydimethylsiloxane with hydrogen groups.

5. The arrangement as claimed in claim 1, wherein the filler amount within the silicone elastomer is less than 45 wt %.

6. The arrangement as claimed in claim 1, wherein the filler amount within the silicone elastomer is 36-43 wt %.

7. The arrangement as claimed in claim 1, wherein the resin of the cap includes a reinforcing structure.

8. The arrangement as claimed in claim 1, wherein the conducting bar is a stator bar of a rotating electric machine.

9. A cap for an electric machine, the cap being filled with a putty, the cap being comprised of a resin which contains a high thermal conductivity filler, and the putty having a thermal conductivity greater than 1 W/mK.

10. The cap according to claim 9, wherein the high thermal conductivity filler is boron nitride, alumina, or combinations thereof.

11. The cap according to claim 9, further comprising a reinforcing structure.

12. The cap according to claim 11, wherein the reinforcing structure together with the resin define a composite material.

13. The cap according to claim 9, wherein the composite material is fiberglass embedded into a resin matrix.

* * * * *